May 9, 1933.  G. R. TUCKER  1,907,617
MANUFACTURE OF RUBBER BONDED ASBESTOS
Filed April 17, 1931
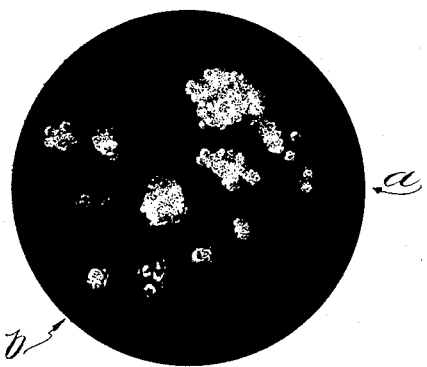
Inventor
George R. Tucker
by Roberts, Cushman & Woodberry.
Attys.

Patented May 9, 1933

1,907,617

UNITED STATES PATENT OFFICE

GEORGE R. TUCKER, OF NORTH ANDOVER, MASSACHUSETTS, ASSIGNOR TO DEWEY AND ALMY CHEMICAL COMPANY, OF CAMBRIDGE, MASSACHUSETTS, A CORPORATION OF MASSACHUSETTS

MANUFACTURE OF RUBBER BONDED ASBESTOS

Application filed April 17, 1931. Serial No. 530,999.

This invention relates to the manufacture of rubber-bonded asbestos products and generally comprises the addition of a suitably preaggregated latex to an asbestos water slurry, mixing the mass to distribute the rubber between the particles of asbestos, and forming asbestos-rubber materials from the resulting mixture by any of the well-known asbestos sheeting, felting or paper-making processes.

According to the process of the invention may be manufactured such specific articles as rubberized asbestos paper, gasket material, fiber board, friction material such as brake lining, brake blocks and the like, electrical insulating panels, etc.

An object of the invention is to provide a simpler and more easily regulated process than any heretofore known for the treatment of asbestos with rubber latex. Another object of the invention is to provide a more intimate consociation of latex-rubber and asbestos than has heretofore been possible. Other objects and advantages of the invention will become apparent from its more detailed description.

If ordinary commercial rubber latex be stirred into an asbestos slurry, the asbestos "balls up" and tends to form a coherently united mass, a mass which no longer fills the dispersing liquor, is no longer water-dispersible, and could not be practically subjected to any of the well-known asbestos sheeting, felting, or paper-making processes.

This coherent matting of asbestos is thought to be due to its envelopment by coagulated rubber resulting from the inherent coagulative influence of natural asbestos. If sufficient latex be added to provide a quantity of rubber equal to 10% or more of the weight of asbestos, only a part of the rubber is coagulated and serves to entangle the asbestos while the rest of the rubber remains colloidally dispersed in the liquor and imparts to it a milky appearance. If much less rubber be added, all of the rubber coagulates and the aqueous liquor becomes clear. In all cases, however, except where minute quantities of rubber are used, the asbestos is coherently entangled by coagulated rubber in such a way that the mass can not be successfully formed and assembled according to any known asbestos assembly processes.

These particular difficulties have been recognized and overcome in prior processes by the joint use of a protective agent and coagulant. The protective agent performed the two-fold function of protecting the latex against the coagulative influence of the asbestos and of facilitating and preserving dissemination and dispersion of the asbestos throughout the aqueous medium. The function of the coagulant was to deposit the rubber within the asbestos mass while the protective agent ever tended to preserve the dissemination and dispersion of the asbestos throughout the aqueous medium.

Thus, more concretely, asbestos was dispersed in water. To this asbestos slurry was added the desired quantity of rubber latex containing a small amount of a suitable protective agent. Such suitable protective agents were proteins, sulfonated oils, or the like. Due to the presence of the protective agent, there was no tendency for the rubber to coagulate and envelop the asbestos. The rubber was deposited within the asbestos mass only when a coagulative agent was added. Then the rubber became associated with the asbestos while the asbestos remained sufficiently well dispersed and disseminated throughout the aqueous bath to be assembled according to well-known asbestos sheeting, felting, or paper-making processes.

These processes have always been attended with serious disadvantages and these have militated against their more general adoption. Thus, successful operation and control of these processes demands the exercise of greater care and skill than is generally practiced in the art of treating asbestos slurries. Even when such care and skill is applied, there is still much left to be desired. Careful study has revealed that the true function of the coagulant is to aggregate the latex particles. When, and not until, the rubber aggregates have attained a sufficient size, they are deposited within or retained by the aqueous suspended asbestos. The characteristics of the finished product, however, are largely dependent on two factors: the size of the rubber aggregates which are deposited; and the extent to which the asbestos is dispersed and disseminated throughout the aqueous bath, i. e. the completeness with which the asbestos is and remains opened up. If the deposited rubber aggregates be large, the product will lack uniformity and rubber continuity; while if the asbestos be poorly dispersed and disseminated throughout the aqueous bath, the resulting product will lack strength and density. The ultimate aim is, therefore, to maintain a maximum of dispersion and dissemination of the asbestos throughout the aqueous bath with formation and deposition of the smallest rubber aggregates that can be extracted by the asbestos from the aqueous medium and retained by the aqueously suspended asbestos. This aim is never accomplished by prior methods because the coagulative agent inherently and inevitably exercises an aggregating influence upon the dispersed and disseminated asbestos as well as upon the rubber latex particles. The protective agent may tend to minimize the detrimental flocculating influence of the coagulating agent upon the asbestos while the less resistant latex particles are suitably aggregated; but its use is only a compromise at best. The very function of the coagulative agent is therefore inimical to excellency of dispersion and dissemination of the asbestos throughout the aqueous bath and superiority of the final product is sacrificed.

Nor are these the only disadvantages of the process. For many purposes the nature and character of the coagulative agent is objectionable. It may exercise a detrimental influence upon the ageing qualities of the finished product; or it may cause a low dielectric strength and preclude the possibility of using the finished product for electrical insulating purposes. In many cases either the protective or the coagulative agent may cause an objectionable water absorptivity of the finished article.

I have now discovered that all of these disadvantages are overcome and new advantages accrue if the rubber latex particles be suitably preaggregated before they are added to the asbestos slurry. In this connection it is not known what causes the rubber particles of an aqueous dispersion thereof to deposit upon and/or be retained by the aqueously suspended asbestos of an asbestos slurry when the coagulation effect of the asbestos has been inhibited as by a suitable protective; but the necessary requisites for such retainment are known. One of these requisites demands a particle size larger than a certain minimum value. This suggests that the rubber retention is due to mere physical entrainment but such is problematical and need not concern us here. In the present process, the essential particle size may be derived from ordinary latex by the process of aggregation; and the aggregating process is entirely independent of the asbestos which is subsequently to retain the preformed aggregates. Whereas in previous processes the particles of latex have been aggregated in the presence of the asbestos, I find that it is decidedly advantageous to preaggregate the particles of latex in the absence of the asbestos and then to combine the two. By so doing, it is possible to retain in fullest measure an initially excellent dispersion and dissemination of the asbestos throughout the aqueous bath and to avoid the necessity of an added agent protective of the latex against the coagulative effect of the asbestos. Asbestos slurried in water does not react with aggregated latices as it does with unprotected commercial ammoniacal latex to form coherent coagula. Aggregated latices may be added to asbestos slurries in any amount without the necessity of a protective and this is of advantage.

An instance of aggregation of latex particles, adapted to function in association with fibers in accordance with the invention herein described, is illustrated by the accompanying drawing of an actual photomicrograph, taken at a magnification of 900 diameters, in which a few isolated non-aggregated latex particles are shown, as at (a) and aggregates of various sizes at (b).

As suitable aggregated latices I may use any latex in which the average particle size lies between minimum and maximum values, as hereinbelow stated. The particles of such latices are retained by ordinary filter paper, i. e., will not penetrate the interstices thereof, and readily cream on standing with the formation of a water-clear lower layer (whereas normal unaggregated latex particles will not so cream as to yield a clear subnatant layer). Whereas I prefer to use aggregated latices in which the particle size is of the order of 50 to 200 microns, I find, however, that for some purposes, as with very coarse asbestos for instance, it is permissible although not advisable, to employ aggregated latices in which the particle size may reach 500 microns. The applicability of aggregated latices to the present invention is not otherwise fundamentally dependent upon the aggregating conditions and these generally form no part of the present invention. For purposes of aggregation may be used such aggregating agents as hydrochloric acid, acetic acid, aluminum sulfate, etc., but it is to be understood that the invention is in nowise so restricted. Many methods are known for deliberately aggregating the particles of rubber latex without coalescence of aggregates or ensuing coagulation and all these methods are applicable when the degree of aggregation is controlled within the above stated limits.

Different latices require different quantities of aggregating agents to produce aggregated latices of desired particle size. The quantity of aggregating agent required to produce the desired degree of aggregation in a given latex may be readily determined by means of a few control tests. For this purpose a series of experiments is made in which increasing doses of the aggregating agent are added respectively to a given weight of the latex in each case. If the variation in the quantity of aggregating agent has been sufficiently large, it will be found that those samples in which a lesser quantity of the aggregating agent has been used show no tendency to cream on standing to form a clear lower layer substantially free from turbidity due to colloidally dispersed rubber; while those samples in which larger quantities of the aggregating agent have been used will cream on standing for a few hours, or when diluted with water and allowed so to stand, to form a clear lower layer which is substantially free from any turbidity due to colloidally dispersed rubber. Similarly, if an attempt be made to filter the samples of treated latex through ordinary filter paper, it will be found that where lesser quantities of the aggregating agent were used all or part of the rubber of the latex will pass through the filter paper as evidenced by the appearance of a milky filtrate. It will be found, however, that where larger quantities of the aggregating agent were used, practically all of the rubber will be retained by the filter paper and a clear filtrate substantially free from turbidity due to colloidally dispersed rubber will be obtained. In general, it will be found that aggregated latices which cream on standing for a few hours, or when diluted with water and allowed to stand to form a clear lower layer, will also yield a substantially clear filtrate when an attempt is made to filter them through ordinary filter paper. And, conversely, an aggregated latex, the rubber particles of which are retained by ordinary filter paper, will cream on standing for a few hours or when diluted with water and allowed to stand, will form a substantially clear lower layer. For the purpose of my invention I generally prefer to employ the smallest quantity of aggregating agent which will cause the rubber particles to be retained by ordinary filter paper or to rise on standing to form a clear lower layer.

Whereas methods are known, and it is feasible, to aggregate the particles of latices in relatively concentrated condition (20 to 40% rubber), I generally prefer to dilute the latex to a 5 to 10% rubber content before aggregating the particles thereof.

The following example will more clearly illustrate the method that I have found satisfactory to determine suitable aggregating conditions for a given latex; but inasmuch as aggregating conditions generally form no part of my invention it will be understood that these results are only included for the convenience of those who may desire to prepare aggregated latices incident to the practice of my invention. The following series of experiments were made using an ordinary commercial latex which contained 39.5% rubber and .90% ammonia ($NH_3$). The latex possessed a "mechanical stability" of 6½ minutes when subjected to the mechanical stability test commonly employed in the trade. One volume of this latex was diluted with six volumes of water and to three hundred fifty cubic centimeter portions of this diluted material was added with rapid stirring varying quantities of a 10% solution of paper maker's alum ($Al_2(SO_4)_3.18H_2O$). The results are tabulated below.

| Experiment | Ccs. of paper-maker's alum solution added | Behavior on standing | Behavior towards ordinary filter paper | Behavior towards an asbestos slurry |
|---|---|---|---|---|
| 1 | 5 | The latex did not cream on standing to form a clear lower layer. | The filtrate was turbid due to the pressence of colloidally dispersed rubber. | The asbestos matted and clotted under the influence of the treated slurry. |
| 2 | 10 | do | do | Do. |
| 3 | 15 | do | do | Do. |
| 4 | 20 | do | do | The asbestos showed a slight matting and clotting tendency. |
| 5 | 25 | The latex creamed on standing to form a clear lower layer. | The filtrate was clear. | The asbestos did not mat and clot, but the aqueous bath showed substantially no rubber aggregates that were free and unattached to the asbestos. |
| 6 | 30 | do | do | Do. |
| 7 | 35 | do | do | Do. |
| 8 | 40 | do | do | Do. |
| 9 | 45 | do | do | Do. |
| 10 | 50 | do | do | Do. |

From the above it is apparent that the modified latices of Experiments 1, 2, 3, and 4 are not suited to the purposes of my invention. Like ordinary untreated latex they cause the particles of asbestos of an asbestos slurry to become matted and clotted. The modified latices of Experiments 5 through 10 inclusive, however, do not cause the particles of asbestos of an asbestos slurry to become matted and clotted and are suited to the purposes of my invention. Since it is preferable to employ the smallest permissible quantity of aggregating agent, the modified latex of Experiment 5 would be best suited to the purposes of my invention.

Other latices would require different quantities of paper-maker's alum to produce the results indicated above, but the general method is applicable to all latices.

Alternative to the use of paper-maker's alum in the above experiments may be used other aggregating agents such as aluminum chloride, sodium silico-fluoride, etc.

The phenomenon of aggregation without coagulation may be produced in a given latex by rather largely varying amounts of certain agents productive of aggregation. Thus aggregation may be produced, as in the above examples, by the addition of small amounts of an aggregating agent. If, however, a certain increased amount is added to a quantity of latex, the latex may then coagulate or tend to coagulate. Nevertheless, a still larger amount in another like quantity of latex may produce aggregation without coagulation. A still further increase in the amount of agent added together with another quantitatively identical sample of the same latex will be found to leave the latex particles individually dispersed or substantially so, that is, will not cause appreciable aggregation; while an even greater amount of the agent added in like manner will cause aggregation again; all of which is to say that the aggregation of latex by increasing amounts of certain agents results in an "irregular series" and it is possible to produce aggregations, serviceable for the purposes of this invention, by the use of three different ratios of aggregating agent to latex; but I prefer, in general, to use the minimum amount of agent which will produce the desired size of aggregates.

Control of aggregation is facilitated by, but not necessarily dependent on, the use of a protective agent for the latex. For this purpose may be used any of the well-known latex protectives. Suitable examples are hemoglobin, serum albumen, casein, complex aromatic sulfonic acids such as are obtained by condensing a naphthalene sulfonic acid with an aliphatic alcohol, etc. These may be added to the latex in quantities corresponding to from 1 to 10% of the rubber content. Then when the aggregative agent is added, the resulting aggregates are smaller and of more uniform size than could have been obtained, in like concentration, without the use of the protective agent.

The addition of a protective agent to the latex prior to the aggregation thereof may serve not only to control the size and uniformity of the formed aggregates but to facilitate and accentuate the dispersion and dissemination of the asbestos of an asbestos-water slurry when the so-formed preaggregated latex is added thereto. This is of advantage in that the preaggregated latex may be added to a coarse aqueous suspension of asbestos through and between which the rubber aggregates are more readily and easily distributed than through a water slurry of well dispersed and disseminated asbestos; but simultaneously with distribution of the rubber aggregates in and between the coarsely suspended particles of asbestos, and before material consociation of rubber and asbestos occurs, the asbestos becomes, under the influence of the protective, well dispersed and disseminated throughout the aqueous bath and simultaneously, or shortly thereafter, consociation of rubber and asbestos occurs. In this manner it is possible to obtain a consociation of rubber and asbestos suspended in an aqueous bath, the asbestos particles of which are so well dispersed and disseminated throughout the aqueous bath that difficulty would ordinarily be encountered in uniformly distributing rubber aggregates therethrough.

While I usually prefer to add the protective agent to the latex prior to the aggregation thereof and thereby derive benefit from the presence of the protective while the latex is being suitably aggregated, as stated, I may, however, add the protective agent to a previously aggregated latex and thus derive a good dispersion and dissemination of the asbestos throughout an aqueous bath when the mixture of aggregated latex and protective are added thereto.

I have also discovered as part of this invention that certain agents may perform the twofold function of suitably aggregating the particles of a latex and of dispersing and disseminating the asbestos of an asbestos-water slurry when the so-aggregated latex is added thereto. These agents are such as aluminum chloride, thorium nitrate, or polyvalent metal salts generally of monobasic acids. If the particles of a latex be suitably aggregated with the aid of one of these agents, and then if the so-aggregated latex be stirred into an asbestos-water slurry, it will be observed that the dispersion and dissemination of the asbestos throughout the aqueous bath is accentuated, i. e., the particles of asbestos spread apart and tend to fill the watery medium and there is less tendency for the suspended particles of asbestos to settle in the dispersing liquor of the slurry. This accentuation of the dispersion and dissemination of the asbestos of an asbestos-water slurry is of advantage, as stated; but the effect is particularly advantageous when derived from an agent which also serves the purpose of pre-aggregating the latex particles as well, whereby the necessity of using an additional agent, which is solely dispersive of the asbestos, is obviated.

Wherever the ultimate presence of either an aggregative or protective agent is objectionable, it may be easily removed from the aggregated latex by washing. To this end, the latex may be successively diluted with water and reconcentrated for which purpose gravity separation is effective. For most purposes, however, this procedure is not necessary. In this connection it may be pointed out that the quantities of aggregative and protective agents required for the purposes of preparing such aggregates are much less than those required in the operation of prior processes. In those processes it was necessary to produce the same concentrations of dissolved coagulant and/or protective in the large volume of dispersing liquor of the fiber slurry as is required in the very much smaller volume of latex required for the preparation of aggregates for the present invention.

According to the general procedure above mentioned and by the suitable choice of protective and aggregating agents, it is possible to produce aggregated latices of different hydrogen ion concentrations. Thus if an alkaline aggregate be used to aggregate the latex particles, i. e., sodium silico fluoride, the resulting aggregated material may react more or less strongly alkaline. Similarly it is equally practical to produce acid-reacting aggregated latices and it is furthermore apparent that the hydrogen ion concentration of such materials may be still further modified within wide limits by the addition of hydrogen ion controlling agents. This remarkable latitude in hydrogen ion concentration is possible because the relatively large rubber particles of an aggregated latex have much less tendency to coalesce to form larger masses or a coherent coagulum than those of ordinary latex. This feature presents advantages that the heretofore known processes have not afforded; thus it will be apparent to those skilled in the art, that the hydrogen ion concentration of the prepared latex may be adjusted to the requirements of the asbestos slurry. Heretofore it has been customary to adapt the asbestos slurry to the hydrogen ion concentration of the latex and by so doing it has frequently been necessary to depart from the conditions best suited to the individual or process requirements of the asbestos.

Artificial as well as natural dispersions of rubber are adapted to the purposes of this invention and the term "latex" as used herein is intended to denote any aqueous colloidal rubber dispersion whether of natural or artificial origin. Artificial dispersions respond to the same general manipulative procedures as ordinary latex. In this connection, however, it is to be noted that the process of redispersing rubber may be controlled directly to yield a dispersion in which the particle size corresponds with the requirements of this invention. Such a product may be immediately suited to present purposes without further modification.

The asbestos water slurry which is to be treated with latex modified as described may be prepared in a variety of ways. Thus the asbestos may be merely suspended in water by stirring or agitating the mass in a suitable tank, or it may be placed in a beating engine and the mass beaten according to usual asbestos paper-making procedure. If maximum benefit it is to be derived from the inherent advantages of the invention, however, care should be taken to insure thorough dispersion and dissemination of the asbestos throughout the aqueous medium. Simple mechanical agitation is effective for this purpose, but it is tremendously facilitated by the use of suitable asbestos dispersing agents such as casein and hemoglobin. These agents are generally used in quantities corresponding to 1% or less of the weight of dry fiber.

It should be pointed out, however, that the use of unduly large quantities of protective colloids such as hereinbefore mentioned to control the aggregation of latex or to disperse and disseminate the asbestos throughout the aqueous bath is to be avoided and may be detrimental. If a larger quantity of such materials be used than is essential to suitably control the aggregation of the latex or to disperse and disseminate the asbestos throughout the aqueous bath the excess will tend to "lubricate" the dispersed rubber particles and may prevent their attachment to or retention by the aqueously suspended asbestos. In such cases the bath will remain turbid due to the presence of dispersed rubber particles. When an attempt is made to remove the aqueous dispersing medium, as by filtration in accordance with any of the well-known asbestos felting, sheeting, or paper-making processes, the dispersed rubber particles will either be lost in the effluent liquor, or if retained by the asbestos, the retention will depend entirely on the filtering action of the asbestos, a circumstance which leads to an uneven distribution of rubber and consequently a non-uniform product.

After the asbestos has been suitably dispersed and disseminated throughout the aqueous bath, it is ready to be treated with preaggregated latex. At this point the consistency of the slurry should be sufficiently fluid to permit of rapid mixing. Such will usually obtain at asbestos concentrations of from 5% to 15%. The preaggregated latex is then added to the agitated slurry and mixing continued until the aqueous liquor is entirely free from any rubber turbidity. This will usually occur within five to ten minutes. Herein lies another advantage of the present process. Other processes have required a much longer time to effect consociation of rubber and asbestos.

The preaggregated latex should preferably be added to the asbestos slurry in dilute form. For most purposes a concentration of rubber aggregates of about 5% is satisfactory. In order to obtain best results the dilute dispersion of aggregates should be added slowly to insure a uniformity of rubber distribution.

Sometimes it is even desirable to spray the preaggregated latex into the agitated mass. This procedure is particularly applicable when the mixing is done in a paper beater, in which case the preaggregated latex is preferably sprayed into the beater immediately in front of the beater roll.

According to the present invention a quantity of rubber corresponding to as much as 50% of the weight of the asbestos may be incorporated. For most purposes, however, such as for the manufacture of brake lining or gasket material, about 20% of rubber will give best results. For other purposes a very few percent of rubber may be advantageously effective.

When desired, the invention permits the inclusion of fillers, compounding, and pigmenting agents. These may be best added to the asbestos slurry prior to the addition of preaggregated latex thereto. For this purpose best results will be obtained if the materials are added as a water suspension which has been previously ground, such as in a paint or ball mill, to insure fineness of subdivision. Examples of suitable fillers, compounding and pigmenting agents are whiting, barytes, carbon black, iron oxide, sulfur, zinc oxide, graphite, finely divided metals such as lead, etc. In some cases a filler, compounding or pigmenting agent may perform the additional function of aggregating the latex particles. Such an agent is zinc oxide. When added in suitable quantities and under appropriate conditions to ordinary latex, it brings about the desired aggregation. This aggregating property of zinc oxide is well known.

It should be understood that the present disclosure is for the purpose of illustration only and that this invention includes all modifications and equivalents which fall within the scope of the appended claims.

I claim:

1. Method of treating mineral fibers, normally coagulative of rubber dispersions, which comprises preaggregating the rubber dispersion, and thereafter contacting the fibers therewith.

2. Method of treating asbestos, which comprises as steps, preaggregating a dispersion of rubber and thereafter contacting the asbestos therewith.

3. Method of treating asbestos, which comprises as steps, preaggregating a dispersion of rubber particles to an average particle size of aggregates between 50 microns and 500 microns and thereafter contacting the asbestos therewith.

4. Method of treating asbestos, which comprises as steps, preaggregating a dispersion of rubber particles to an average particle size of aggregates between 50 microns and 200 microns and thereafter contacting the asbestos therewith.

5. A slurry of asbestos fibers, in which the fibers are in dispersion in an aqueous medium, in discrete distribution and severally consociated with preaggregated particles of rubber and substantially free from rubber coagula.

6. Method of treating asbestos which comprises preaggregating the particles of a rubber dispersion in the presence of a protective therefor and mixing the resulting dispersion of preaggregated particles with asbestos in aqueous suspension whereby attachment of the preaggregated particles to the asbestos is effected.

7. Method of treating asbestos which comprises mixing asbestos in aqueous suspension with preaggregated rubber particles in the presence of an agent dispersive of the asbestos whereby attachment of the preaggregated particles to the asbestos is effected.

8. Method of treating asbestos which comprises preaggregating the particles of a rubber dispersion by means of a polyvalent metal salt of a monobasic acid and mixing the resulting dispersion of preaggregated particles with asbestos in aqueous suspension whereby attachment of the preaggregated particles to the asbestos is effected.

9. Method of treating asbestos which comprises preaggregating the particles of a rubber dispersion by means of aluminum chloride and mixing the resulting dispersion of preaggregated particles with asbestos in aqueous suspension whereby attachment of the preaggregated particles to the asbestos is effected.

10. Method of treating asbestos which comprises preaggregating the particles of a rubber dispersion, washing the resulting preaggregated particles to remove therefrom objectionable water-soluble constituents, and thereafter mixing the washed preaggregated particles with asbestos in aqueous suspension whereby attachment of the washed preaggregated particles to the asbestos is effected.

11. Method of making asbestos-rubber products which comprises preaggregating the particles of a rubber dispersion, mixing asbestos in aqueous suspension with the preaggregated particles whereby attachment of the preaggregated particles to the asbestos is effected, and subsequently forming a sheet from the resulting rubberized asbestos slurry.

12. Method of making asbestos-rubber products which comprises preaggregating the particles of a rubber dispersion in the presence of a protective therefor, mixing the dispersion of preaggregated particles with asbestos in aqueous suspension whereby attachment of the preaggregated particles to the asbestos is effected, and subsequently forming a sheet from the resulting rubberized slurry.

13. Method of making asbestos-rubber products which comprises mixing asbestos in aqueous suspension with preaggregated rubber particles in the presence of an agent dispersive of the asbestos whereby attachment of the preaggregated particles to the asbestos is effected and subsequently forming a sheet from the resulting rubberized asbestos slurry.

Signed by me at Cambridge, Massachusetts, this 14th day of April, 1931.

GEORGE R. TUCKER.